United States Patent [19]
Aoyagi

[11] Patent Number: 5,216,440
[45] Date of Patent: Jun. 1, 1993

[54] GRADATION CONTROL CIRCUIT OF LINE THERMAL PRINTER

[75] Inventor: Toshiharu Aoyagi, Tokyo, Japan

[73] Assignee: Seiko Instruments Inc., Japan

[21] Appl. No.: 639,811

[22] Filed: Jan. 9, 1991

[51] Int. Cl.[5] ............................................. B41J 2/365
[52] U.S. Cl. ................................. 346/76 PH; 358/298
[58] Field of Search ................... 346/76 PH; 358/298; 400/120

[56] References Cited

U.S. PATENT DOCUMENTS

| | | | |
|---|---|---|---|
| 4,540,991 | 9/1985 | Kariya et al. | 346/76 PH |
| 4,724,336 | 2/1988 | Ichikawa et al. | 346/76 PH |
| 4,801,948 | 1/1989 | Kato | 346/76 PH |
| 4,827,279 | 5/1989 | Lubinsky et al. | 346/76 PH |

FOREIGN PATENT DOCUMENTS 0245006 11/1987 European Pat. Off.
0307138 3/1989 European Pat. Off.

*Primary Examiner*—Benjamin R. Fuller
*Assistant Examiner*—Huan Tran
*Attorney, Agent, or Firm*—Bruce L. Adams; Van C. Wilks

[57] ABSTRACT

A gradation modulating apparatus is provided in a line thermal printer having a plurality of resistive elements arranged linearly widthwise of a medium sheet for printing gradated dots line-sequentially according to gradation image data. A memory is provided for storing individual weight data representative of energy generation rates of respective resistive elements, in corresponding addresses. An address generator is responsive to serial input of the gradation image data for generating an addressing signal effective to read out the stored individual weight data. A modulator is receptive of the inputted gradation data and the read weight data in synchronization with each other for producing modulated gradation image data according to the weight data. A latching circuit is connected for latching the modulated gradation image data line-sequentially. A driver is connected for applying driving signals regulated according to the latched modulated gradation image data to the resistive elements to enable the same to print dots having substantially the same print density for a given gradation level defined by the input gradation data.

11 Claims, 6 Drawing Sheets

FIG. 4

| ADDRESS | WEIGHT DATA | RESISTIVE ELEMENT |
|---|---|---|
| $A_0$ | $L_i$ | $B_0$ |
| $A_1$ | $L_i$ | $B_1$ |
| $A_2$ | $L_i$ | $B_2$ |
| $A_3$ | $L_i$ | $B_3$ |
| $A_4$ | $L_i$ | $B_4$ |
|  |  |  |
| ⋮ | ⋮ | ⋮ |
| $A_n$ | $L_i$ | $B_n$ |

$0 \leq i \leq 15$

FIG. 5

| ADDRESS | RESISTIVE ELEMENT | APPLICATION VOLTAGE | WEIGHT DATA |
|---|---|---|---|
| $A_0$ | $B_0$ | $V_0$ | $L_{0 \sim 15}$ |
| $A_1$ | $B_1$ | $V_1$ | $L_{0 \sim 15}$ |
| $A_2$ | $B_2$ | $V_2$ | $L_{0 \sim 15}$ |
| $A_3$ | $B_3$ | $V_3$ | $L_{0 \sim 15}$ |
| ⋮ | ⋮ | ⋮ |  |
| $A_n$ | $B_n$ | $V_n$ | $L_{0 \sim 15}$ |

| ADDRESS | RESISTANCE VALUE | VOLTAGE VALUE | ELECTRIC POWER | WEIGHT DATA |
|---|---|---|---|---|
| $A_1$ | $R_1$ | $V_1$ | $V_1^2/R_1$ | $L_{0\sim15}$ |
| $A_2$ | $R_2$ | $V_2$ | $V_2^2/R_3$ | $L_{0\sim15}$ |
| $A_3$ | $R_3$ | $V_3$ | $V_3^2/R_3$ | $L_{0\sim15}$ |
| ⋮ | ⋮ | ⋮ | ⋮ | ⋮ |
| $A_n$ | $R_n$ | $V_n$ | $V_n^2/R_n$ | $L_{0\sim15}$ |

FIG. 8

| WEIGHT DATA | DOT DENSITY RANGE |
|---|---|
| L0  | $D_{min}$ ~ $D_{min}+(D_{max}-D_{min})/16$ |
| L1  | $D_{min}+(D_{max}-D_{min})/16$ ~ $D_{min}+(D_{max}-D_{min})/16 \times 2$ |
| L2  | $D_{min}+(D_{max}-D_{min})/16 \times 2$ ~ $D_{min}+(D_{max}-D_{min})/16 \times 3$ |
| L3  | $D_{min}+(D_{max}-D_{min})/16 \times 3$ ~ $D_{min}+(D_{max}-D_{min})/16 \times 4$ |
| L4  | $D_{min}+(D_{max}-D_{min})/16 \times 4$ ~ $D_{min}+(D_{max}-D_{min})/16 \times 5$ |
| L5  | $D_{min}+(D_{max}-D_{min})/16 \times 5$ ~ $D_{min}+(D_{max}-D_{min})/16 \times 6$ |
| L6  | $D_{min}+(D_{max}-D_{min})/16 \times 6$ ~ $D_{min}+(D_{max}-D_{min})/16 \times 7$ |
| L7  | $D_{min}+(D_{max}-D_{min})/16 \times 7$ ~ $D_{min}+(D_{max}-D_{min})/16 \times 8$ |
| L8  | $D_{min}+(D_{max}-D_{min})/16 \times 8$ ~ $D_{min}+(D_{max}-D_{min})/16 \times 9$ |
| L9  | $D_{min}+(D_{max}-D_{min})/16 \times 9$ ~ $D_{min}+(D_{max}-D_{min})/16 \times 10$ |
| L10 | $D_{min}+(D_{max}-D_{min})/16 \times 10$ ~ $D_{min}+(D_{max}-D_{min})/16 \times 11$ |
| L11 | $D_{min}+(D_{max}-D_{min})/16 \times 11$ ~ $D_{min}+(D_{max}-D_{min})/16 \times 12$ |
| L12 | $D_{min}+(D_{max}-D_{min})/16 \times 12$ ~ $D_{min}+(D_{max}-D_{min})/16 \times 13$ |
| L13 | $D_{min}+(D_{max}-D_{min})/16 \times 13$ ~ $D_{min}+(D_{max}-D_{min})/16 \times 14$ |
| L14 | $D_{min}+(D_{max}-D_{min})/16 \times 14$ ~ $D_{min}+(D_{max}-D_{min})/16 \times 15$ |
| L15 | $D_{min}+(D_{max}-D_{min})/16 \times 15$ ~ $D_{max}$ |

FIG. 9

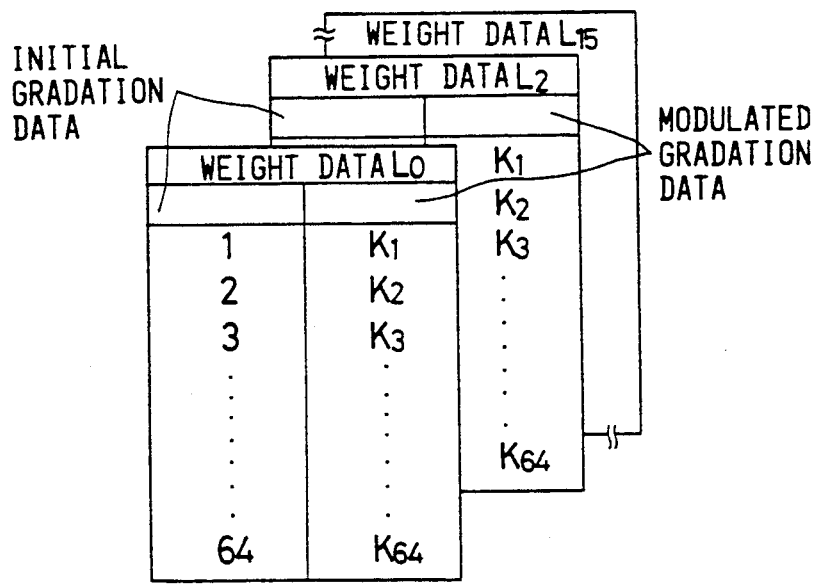

GRADATION CONTROL CIRCUIT OF LINE THERMAL PRINTER

BACKGROUND OF THE INVENTION

The present invention relates to a line thermal printer operative to supply electric energy to a plurality of linearly arranged resistive elements to effect conversion into thermal energy to carry out direct printing or transfer printing on a recording medium, such as a sheet of paper medium.

There has been known a line printer utilizing a thermal head operable according to an image signal for effecting color printing on a paper sheet medium. As shown in FIG. 2A, a platen A is provided for feeding a printing sheet P, and a thermal head C is opposed to the platen A along its rotational axis to effect printing. As shown in FIG. 2B, the thermal head C is comprised of a plurality of linearly arranged resistive elements $B_o$–$B_n$. FIG. 2C shows a driving circuit of the resistive elements $B_o$–$B_n$.

In the conventional line printer, the respective resistive elements $B_o$–$B_n$ of the thermal head C are driven to generate thermal energy according to gradation level data of an image signal fed from a host computer, line-sequentially so as to develop color tones in dot patterns on the printing sheet P. In such construction of the line printer, the plurality of resistive elements $B_o$–$B_n$ must be controlled to generate the same impression density for the same inputted gradation level data so as to avoid dot density variation on the printing sheet P.

However, individual resistive elements $B_o$–$B_n$ of the thermal head C have different resistance values due to patterning errors in the production process, in an allowable range of $\pm 20\%$, thereby resulting in actual print density variation among dots of the resistive elements $B_o$–$B_n$.

Further, as shown in FIG. 2C, the thermal head circuit contains a common resistor component r between adjacent resistive elements $B_o$–$B_n$ so that each of the resistive elements $B_o$–$B_n$ receives varying driving voltage due to the common resistor components r even if the resistance value differences of the elements $B_o$–$B_n$ are compensated or eliminated.

Moreover, as shown in FIG. 3, the thermal head circuit is constructed such that the common voltage $V_o$ is applied through the end elements $B_o$ and $B_n$ so that the effective driving voltage gradually decreases from the end elements to the central element to thereby cause variation of the print dot density.

Furthermore, the thermal head C may not contact uniformly with the print sheet P due to surface unevenness of various components, thereby causing print dot density variation even if the driving current is supplied to the elements for the same duration, thereby disadvantageously degrading printing quality.

In order to eliminate the print dot density variation due to the above noted various reasons, conventionally the resistance values of the respective resistive elements $B_o$–$B_n$ are provisionally measured and external components are connected to compensate variation of the resistance values. However, such construction for coupling a plurality of external adjustment members is very complicating thereby raising production cost.

SUMMARY OF THE INVENTION

In order to eliminate the above noted drawbacks of the prior art, objects of the invention are to provide an improved gradation control circuit of the line thermal printer to achieve high quality of printed image, simplification of the circuit structure and production cost reduction. The gradation control circuit is constructed to suppress color density variation which would be caused by variation in resistance value of the individual resistive heating elements of the thermal head, by variation in effective driving voltage applied to the respective heating elements, and by variation in thermal energy transfer from the individual heating elements to the printing sheet due to relative surface unevenness of the thermal head, thereby achieving uniform printing density throughout the linearly arranged heating elements.

In accordance with the present invention, a line thermal printer is provided with a plurality of dot-forming resistive elements aligned widthwise of a printing sheet and responsive to an image data line-sequentially to effect gradated printing. The inventive gradation control circuit is comprised of data memory means for storing weight data representative of heat-generation or efficiency rates of the individual resistive elements in the form of, for example, effective driving voltage levels applied to the individual elements, composite resistance values of the individual elements, or dot density levels of the individual elements measured when the same gradation image signal is applied throughout the line thermal head. An address generating circuit is provided and operated in response to input of the image data signal to designate addresses of the data memory means to retrieve the stored weight data according to the image data signal. A gradation modulating circuit is provided to receive the retrieved weight data and the inputted image data composed of gradation data for modulating the gradation data based on the weight data in dot-by-dot or bit-by-bit basis to produce modulated gradation data. A driving circuit is connected to produce a pulsive analog driving signal according to the modulated gradation data to drive the resistive heating elements line-sequentially.

The inventive gradation control circuit of the line thermal printer features the weight data memory means for storing weight data in the form of effective driving voltage levels applied to the individual resistive elements, or composite resistance levels of the individual resistive elements each containing specific resistance component and common resistance component, or actual dot density levels of the individual resistive elements measured when the same gradation level signal is inputted to the individual resistive elements, and the gradation modulating circuit for modulating the original gradation data according to the weight data so as to adjust the actual dot density levels. Namely, variation in the thermal energy generated in the individual elements, variation in the driving voltage applied to the individual elements and variation in the surface level of the thermal head are compensated so as to equalize heat-generating rates of the elements by modulating the initial gradation data. The driving circuit is operated according to the modulated gradation data to drive the respective resistive elements so as to eliminate dot density variation which would be caused by the variation in the heat-generating efficiency of the elements.

BRIEF DESCRIPTION OF THE DRAWINGS

FIG. 4 is a table diagram which is provided in a data memory of the FIG. 1 circuit;

FIG. 5 is another table diagram provided in a data memory of the FIG. 1 circuit;

FIG. 8 is a table diagram showing definition of dot density rank;

FIG. 9 is a table diagram showing operation of a gradation modulating circuit of the FIG. 1 circuit;

DETAILED DESCRIPTION OF EMBODIMENTS

Figure 1:
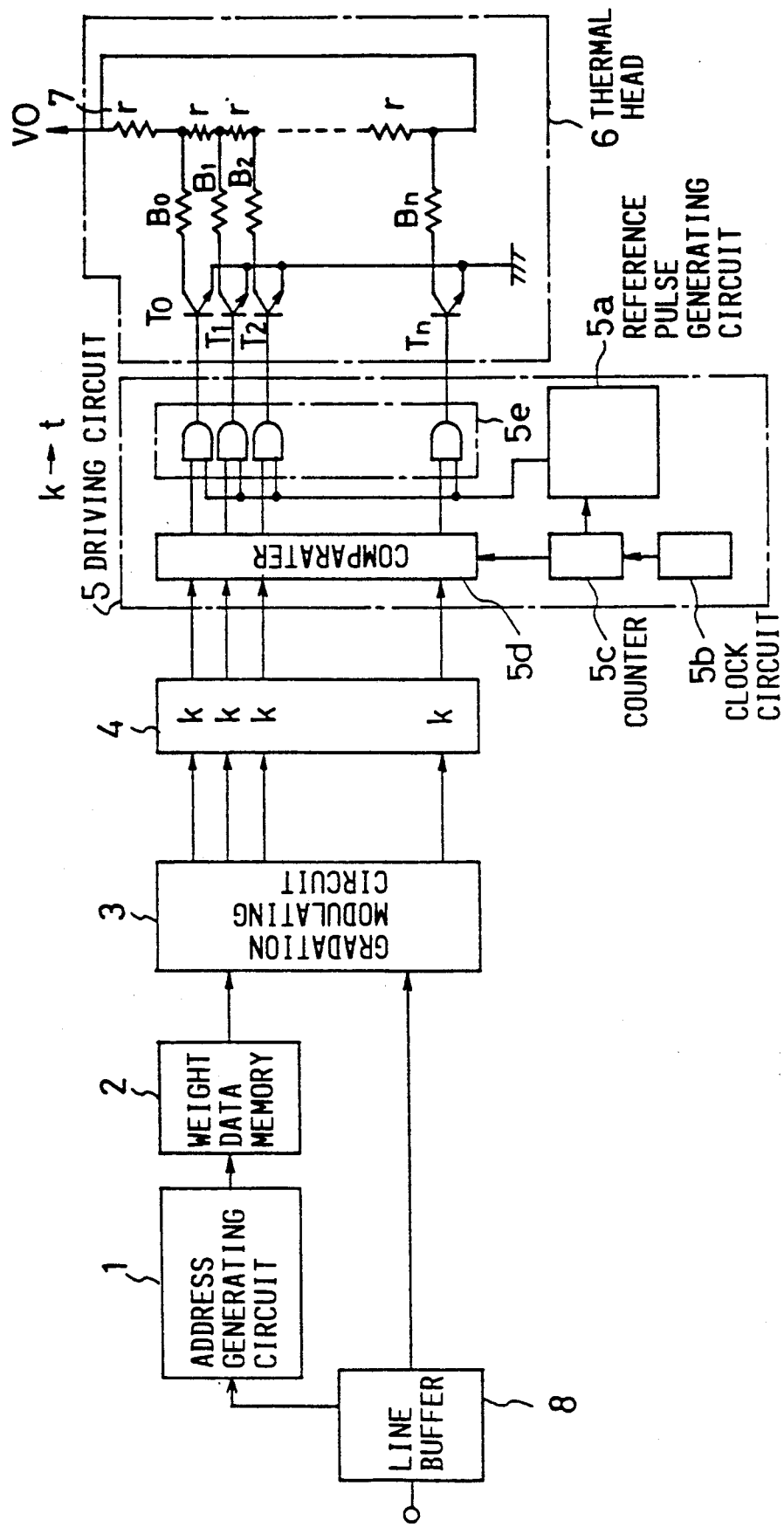
FIG. 1 is a block diagram showing an overall circuit structure of the inventive gradation control circuit in a line thermal printer.
Figure 2A:
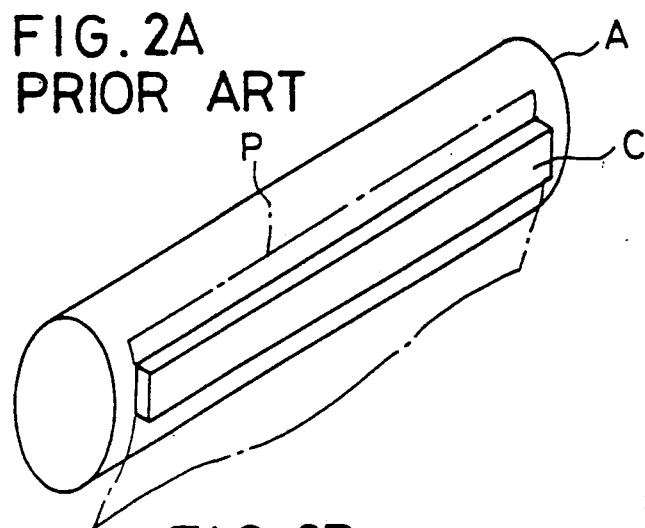
FIG. 2A is a schematic perspective view of the conventional printer head.
Figure 2B:
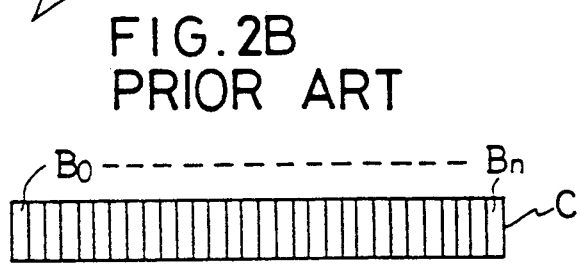
FIG. 2B is a plan view showing arrangement of heating elements on the conventional line thermal head.
Figure 2C:
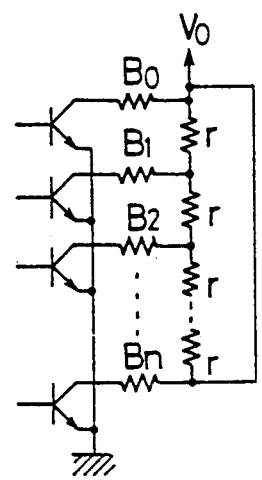
FIG. 2C is a circuit diagram of the conventional thermal head.

Hereinafter, preferred embodiments of the inventive line thermal printer will be described in detail with reference to the drawings. FIG. 1 is a block diagram showing a basic circuit structure of the inventive apparatus. As shown in the figure, the apparatus is comprised of a line buffer 8 receptive of image data line-sequentially from a host computer (not shown). The line buffer 8 is connected to a gradation modulating circuit 3 to feed thereto gradation data in the form of a sequence of gradation data bits in a dot-by-dot basis. The line buffer 8 is also connected to an address generating circuit 1 which operates in synchronization with the input of sequence of the gradation data bits to sequentially generate addresses to designate an n-th dot in response to the occurrence of the n-th gradation data bit.

The address generating circuit 1 is connected to a weight data memory means 2. The weight data memory means 2 is written with weight data in the form of a sequence of weight data bits representative of heat-generating rates of the individual resistive elements, and the memory means 2 is responsive to the inputted address signal to provide the weight data bits in a dot-by-dot basis.

The weight data memory means 2 has an address table, for example as shown in FIG. 4. The table is provided with addresses $A_0, A_1, A_2, \ldots A_n$ which correspond to the order of the resistive elements $B_o$–$B_n$. The weight data having 16 different stepwise values or levels $L_0$–$L_{15}$ is stored in each of the addresses $A_0$–$A_n$. The weight data is indicative of heat-generating rate or efficiency of an individual resistive element, which may be measured in terms of effective applied driving voltage, or individual resistance value of elements, or individual dot density level.

Figure 3:
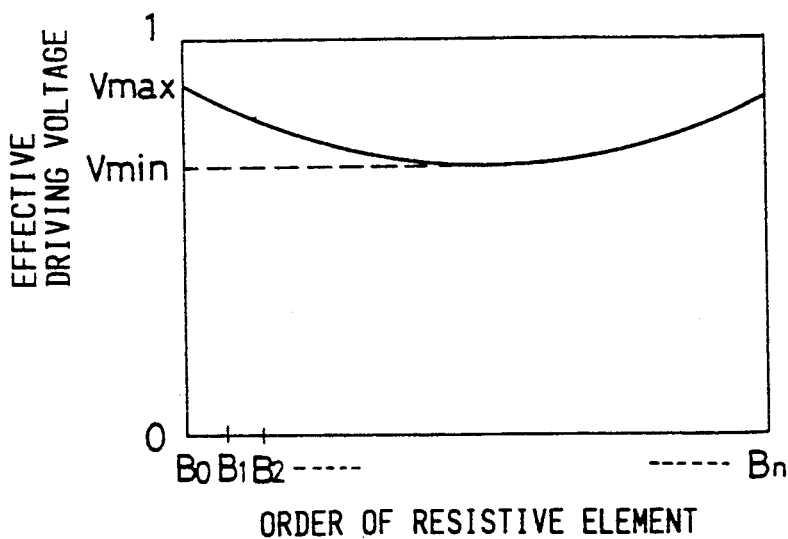
FIG. 3 is a graph showing variation in driving voltage applied to heating elements of the conventional thermal head.

With respect to the individual resistance value of each heating element, the common resistance is varied such that, as shown in FIG. 3, the effective application voltage is varied between Vmax and Vmin throughout the linear arrangement of the resistive heating elements $B_o$–$B_n$. These application voltages $V_0$–$V_n$ of the respective elements $B_o$–$B_n$ are divided into 16 ranks or steps, and are assigned with the corresponding weight data $L_0$–$L_{15}$ as shown in FIG. 5. According to the FIG. 5 table, the individual effective voltage applied to each element is converted into the individual weight data bit which is stored in the corresponding address of the weight data memory means.

Figures 6, 7:
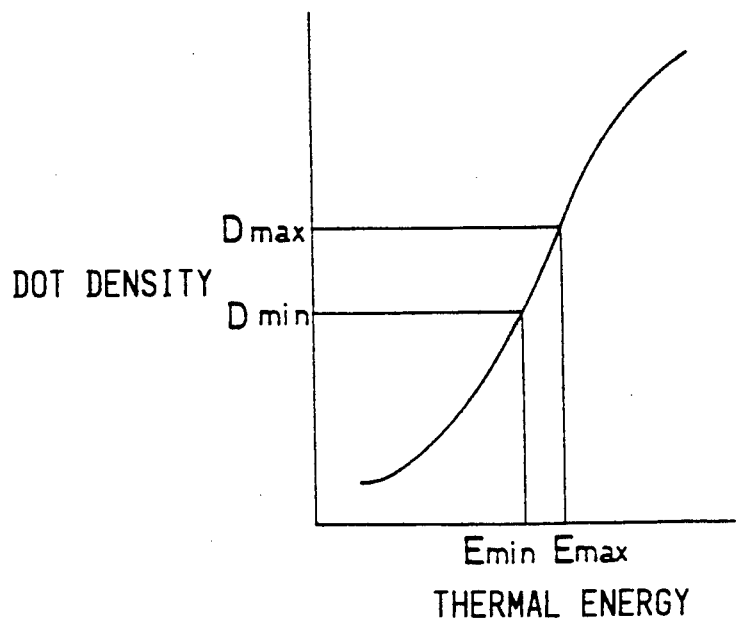
FIG. 6 is still another table diagram provided in a data memory of the FIG. 1 circuit.
FIG. 7 is a graph showing the relation between dot print density and thermal energy generated by a heating element.

With regard to compensation for variation in electric powers of the individual elements, the electric power is varied between $V_{max}^2/Rmin$ and $V_{min}^2/Rmax$ due to variation in the individual composite resistance of a common resistor component and a particular resistor component of each element between Rmax and Rmin. These electric power values $V_1^2/R_1$–$V_n^2/R_n$ of the respective elements are divided into 16 levels $L_0$–$L_{15}$ of the weight data as shown in FIG. 6. According to the FIG. 6 table, the individual electric power values are converted into the 16 weight data levels $L_0$–$L_{15}$ which are stored in the corresponding addresses of the weight data memory means.

With regard to compensation for variation in individual thermal energy due to various physical parameters such as resistance value fluctuation, driving voltage fluctuation and surface uneveness of the thermal head, the thermal energy which is generated in the respective elements are varied between Emax and Emin even if the same gradation data bits are inputted throughout the elements. Consequently, the dot densities are varied in the range between Dmax and Dmin as shown in FIG. 7. This range is divided into 16 steps. FIG. 8 shows the relation between 16 steps of the weight data $L_0$–$L_{15}$ and the values of dot density corresponding to the weight data levels $L_0$–$L_{15}$. According to the FIG. 8 table, the individual dot density value is converted into the weight data which is then stored in the weight data memory means 2.

Returning to FIG. 1, the gradation modulating circuit 3 is connected to the weight data memory means 2 and operates to modulate the original gradation data according to the weight data which is retrieved from the memory means 2 and which is determined in terms of the application voltage, or the electric power dependent on heating element resistivity and common resistivity, or the dot density, of the heating elements $B_o$–$B_n$. A latch circuit 4 is connected to the gradation modulating circuit 3 for latching the modulated gradation data K for the respective heating elements $B_o$–$B_n$, effective to adjust the actual gradation levels of the printed dot densities.

A driving circuit 5 is connected to the latching circuit 4, and operates to convert the modulated gradation data bits in the form of a digital signal stored in the latching circuit 4 into a train of pulses in the form of an analog signal. Each pulse has a duration or width proportional to the value of the corresponding gradation data bit. The circuit 5 generates the analog signal effective to drive the heating elements $B_o$–$B_n$ for optimum time intervals or durations according to the modulated gradation data.

The detailed description is given for the operation of the major circuit components hereinafter. The gradation modulation circuit 3 is composed of a PAL and a memory device which has modulation tables as shown in FIG. 9. The circuit 3 receives the weight data $L_0$–$L_{15}$ from the weight data memory means 2 as its modulation table address so as to determine optimumly modulated gradation data $K_0$–$K_{64}$ according to the inputted original gradation data.

In case of the compensation for variation in the effective driving voltage applied to the respective heating elements, the gradation modulating circuit 3 is provided with a table utilized to set the modulated gradation data effective to realize the optimumly or accurately gradated dot density for each voltage rank or voltage level of the respective heating elements $B_o$–$B_n$. The thermal energy E generated by a resistive or heating element is expressed by $$E = \frac{V^2 \times t}{R},$$

where V denotes an applied driving voltage, t denotes a voltage application duration, and R denotes a resistance of the heating elements. The optimum thermal energy $E_i$ for a given gradation level i is expressed by $$E_i = \frac{V_{max}^2 \times t_s}{R},$$

where Vmax denotes the maximum driving voltage as a reference voltage and ts denotes a standard duration. Then, an optimum dulation $t_k$ for variable driving voltage $V_x$ is determined by the following relation for the same gradation level i:

$$\frac{V_{max}^2 \times t_s}{R} = \frac{V_x^2 \times t_k}{R}$$

In this embodiment, the variable voltage $V_x$ of the heating elements $B_0$–$B_n$ is quantized in terms of weight data or voltage levels $L_0$–$L_{15}$ and is inputted into the gradation modulation circuit 3. Therefore, the thermal energy $E_i$ for the respective voltage levels $L_0$–$L_{15}$ is represented by $$E_i = \frac{L \times t_k}{R}.$$

The FIG. 9 table stores the modulated gradation data in the form of gradation number $K_i$ which can define an optimum duration $t_k$ effective to generate the optimum thermal energy $E_i$.

In case of compensation for variation in generated thermal energy due to composite resistance fluctuation, the gradation modulating circuit 3 is provided with a table utilized to determine modulated gradation data effective to enable the heating elements $B_0$–$B_n$ to generate optimum thermal energy for a given gradation level. The optimum thermal energy $E_i$ for a given gradation level i is represented by the following relation:

$$\frac{V_s \times t_s}{R_s} = \frac{V_n \times t_i}{R_n}$$

where $R_s$ denotes a reference or standard resistance of heating element, $t_s$ denotes a standard voltage duration, $V_s$ denotes a standard voltage value, $R_n$ denotes a specific resistance of each heating element, $V_n$ denotes a specific voltage value, and $t_i$ denotes an optimum voltage duration effective to generate the optimum thermal energy $E_i$ for the given gradation level.

In this embodiment, the thermal energy generated by the respective heating elements $B_0$–$B_n$ is quantized in terms of weight data or ranks $L_0$–$L_{15}$ and is inputted as address of the modulation tables into the gradation modulating circuit 3. The addressed table is stored with the modulated gradation data in the form of gradation number $K_i$ effective to determine the optimum voltage application duration $t_i$ for the different ranks $L_0$–$L_{15}$ of the thermal energy with respect to the same gradation level i.

In case of compensation for variation in dot density due to fluctuation of the generated thermal energy, the gradation modulating circuit 3 is provided with a table utilized to determine modulated gradation data effective to produce optimum dot density for different weight data or different dot density ranks of heating elements $B_0$–$B_n$. By such arrangement, the modulated gradation number is written in the table for equalizing the dot density of the respective heating element for the same gradation level even if the thermal energy rate is varied among the different elements.

Figure 10:
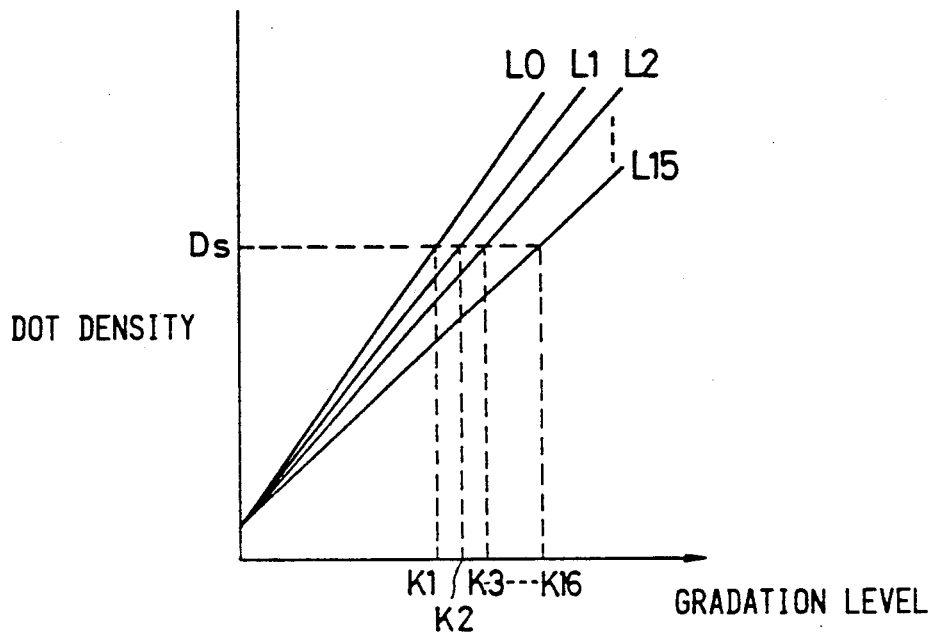
FIG. 10 is a graph showing modulation of gradation level according to dot print density.

For example, as shown in FIG. 10, the dot density is provisionally measured for different input gradation levels in different ranks or classes of thermal energy rate of heating elements. The FIG. 10 graph indicates the relation between the actual dot density and the input gradation level where the ranks $L_0$–$L_{15}$ are set as a parameter. The actual dot density for a given inputted gradation level is known from the graph for each rank of thermal energy rates.

Figure 11:
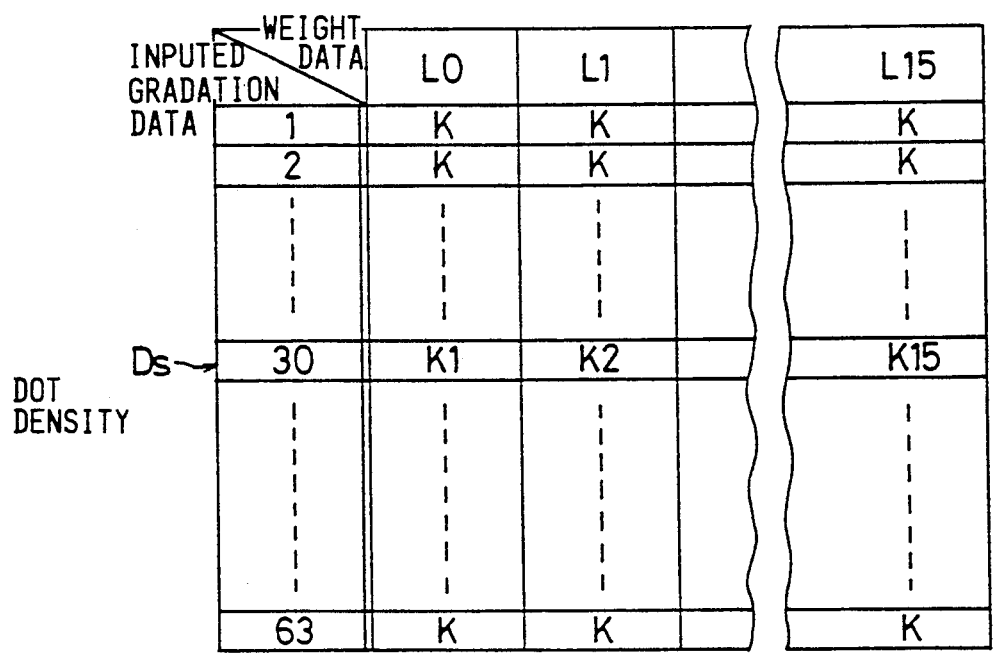
FIG. 11 is a table diagram showing modulation of the input gradation data in the FIG. 1 circuit.

Referring to FIG. 11, when a standard dot density is set to Ds for the 30-th gradation level, in order to achieve the dot density Ds for different ranks of heating elements throughout the line thermal head, the table is written with gradation numbers $K_1, K_2, \ldots, K_{16}$ for the respective ranks $L_0$–$L_{15}$.

The driving signal generating circuit 5 operates, based on the modulated gradation signal fed from the latch circuit 4, to apply a driving voltage $V_0$ to the heating elements $B_0$–$B_n$ for optimum duration so as to effect dot density control individually. This circuit 5 receives the gradation numbers $K_0$–$K_n$ representative of the modulated gradation data. The circuit 5 is provided with a reference pulse generating circuit 5a, a clock circuit 5b and a counter 5c for producing time data corresponding to the gradation numbers $K_0$–$K_n$. The circuit 5 is further provided with a comparator 5d for comparing the gradation numbers $K_0$–$K_n$ and the time data to form digital signals indicative of optimum voltage application durations for the respective heating elements $B_0$–$B_n$. An AND gate circuit 5e carries out logic product operation of the digital signals and the reference pulses to output analog driving signals corresponding to the digital signals.

A thermal head 6 is provided with a plurality of transistors $T_0$–$T_n$ responsive to the corresponding analog driving signals to apply the power source voltage $V_0$ to the individual heating elements $B_0$–$B_n$ during the individually set optimum application duration to thereby compensate the dot densities for variation in the heat generating rates of the elements.

Lastly, the description is given for the operation of the inventive apparatus. Firstly, image gradation data of one line of the thermal head 6 is fed from a host computer (not shown) to the line buffer 8. The gradation data is fed to the gradation modulating circuit 3 in a dot-by-dot basis, as well as to the address generating circuit 1 which sequentially generates the addresses $A_0$-$A_n$ (shown in FIG. 4) in synchronization with the series of the gradation data.

In case of the compensation for variation in the driving voltage due to influence of the common resistance, the data memory means 2 has the table shown in FIG. 5, which is written with the weight data in the form of 16 ranks or levels $L_0$-$L_{15}$ according to the actual application voltage values $V_0$-$V_n$ of the elements $B_0$-$B_n$ in the corresponding addresses.

In case of the compensation for variation in the electric energy due to influences of common resistance and individual resistance, the respective resistive elements $B_0$-$B_n$ receive the electric energies of $V_0^2/R_0$-$V_n^2/R_n$ where $V_0$-$V_n$ indicate application voltage and $R_0$-$R_n$ indicate composite resistance of each element. The values of $V_0^2/R_0, \ldots, V_n^2/R_n$ are sorted into 16 ranks or levels of $L_0$-$L_{15}$ which are stored in the table (FIG. 6) of the data memory means 2.

In case of the compensation for variation in the dot densities due to influence of the thermal energy generated by each heating element, the dot density of each of the heating elements $B_0$-$B_n$ is assigned with one of the 16 ranks or levels $L_0$-$L_{15}$, and the assigned level is written in the corresponding address of the FIG. 4 table in the data memory means 2.

Next, the gradation modulation circuit 3 operates to determine the modulated gradation data throughout the 64 gradations in the form of the gradation numbers $K_0$-$K_{64}$ according to the set ranks $L_0$-$L_{15}$ to determine optimum driving duration of each of the elements $B_0$-$B_n$ so as to compensate for variation in effective application voltage, received electric energy or actual dot density.

Then, the produced gradation numbers $K_0$-$K_n$ are latched in the latching circuit 4 to provide the same to the driving circuit 5. The driving circuit 5 applies to the thermal head 6 the driving signals having optimum durations determined according to the gradation numbers $K_0$-$K_n$ so as to make uniform the actual dot densities of the heating elements $B_0$-$B_n$ for the initially inputted same gradation level, thereby improving quality of the printed image.

As described before, there are three different ways of preparing the looking table in the weight data memory means 2. In a first way, the resistance r of the common electrode is measured, and then the value of application voltage is calculated for the respective elements $B_0$-$B_n$. Thereafter, the calculated value is assigned with one of the levels $L_0$-$L_{15}$. which is written in the corresponding address of the table. In a second way, resistance of each heating element and resistance distribution of the common electrode are measured. Electric energy applied to each element is calculated according to the measured values. The calculated electric energy is classified into 16 levels of weight data, which are then written into the respective addresses of the table. In a third way, provisionally the heating elements are driven by the same electric power to impress the dots. Densities of the impressed dots are measured and classified into 16 levels of weight data, which are written in the table.

As described above, according to the invention, the gradation control circuit is comprised of the memory means for memorizing weight data of each heating element in the form of effective driving voltage level, effective electric energy, or actual dot density level of each element, the gradation modulating circuit for modulating input gradation data into modulated gradation data according to weight data, and the driving circuit for controlling a driving duration of each element according to the modulated gradation data. By such construction, variation in thermal energy generation rate of each heating element can be automatically compensated throughout all of the gradation levels to thereby ensure uniform dot densities for the same input gradation level throughout all of the heating elements. Moreover, the variation in the print dot densities can be compensated without using any external component to thereby reduce production cost of the thermal head.

What is claimed is:

1. A gradation modulating apparatus provided in a line thermal printer having a plurality of resistive elements arranged linearly widthwise of a recording medium for printing gradated dots line-sequentially according to inputted gradation image data, wherein the resistive elements have respective common resistor component values and particular resistor component values, the apparatus comprising: memory means for storing individual weight data, representative of energy generation rates of respective resistive elements dependent on the common resistor component value and the particular resistor component value of each of the resistive elements, in corresponding addresses wherein the individual weight data is determined by dividing the energy generation rates of the respective resistive elements into a predetermined number of levels; address generating means responsive to serial input of the gradation image data for generating an addressing signal effective to read out the stored individual weight data; modulating means receptive of the inputted gradation image data and the read weight data for producing modulated gradation image data according to the weight data; latching means for latching the modulated gradation image data line-sequentially; and driving means for applying driving signals regulated according to the latched modulated gradation image data to the resistive elements to enable the same to print dots having substantially equal print density for a given gradation level defined by the inputted gradation image data.

2. A gradation modulation apparatus according to claim 1; wherein the memory means has means for storing the weight data determined in terms of effective values of voltages applied to the respective resistive elements.

3. A gradation modulation apparatus according to claim 1; wherein the memory means has means for storing the weight data determined in terms of values of thermal energies generated by the respective resistive elements.

4. A gradation modulation apparatus according to claim 1; wherein the memory means has means for storing the weight data determined in terms of a dot print density corresponding to each of the respective resistive elements obtained by applying equal electric power to each of the respective resistive elements.

5. A gradation modulating apparatus for a line thermal printer having a plurality of resistive elements each having a common resistor component value and a particular resistor component value for printing gradated dots according to inputted gradation image data, comprising: memory means for storing at respective addresses individual weight data representative of energy generation rates of respective resistive elements dependent on the common resistor component value and the particular resistor component value of each of the respective resistive elements in corresponding addresses, the individual weight data being determined by dividing the energy generation rates of the respective resistive elements into a predetermined number of levels; address generating means for receiving inputted gradation image data and generating in response thereto an addressing signal effective to read out the stored individual weight data from the memory means; modulating means for receiving the inputted gradation image data and the read weight data for modulating the inputted gradation image data dependent on the read weight data; and driving means responsive to the modulated inputted gradation image data for driving the respective resistive elements.

6. A gradation modulation apparatus according to claim 5; wherein the memory means has means for storing the weight data determined in terms of effective values of voltages applied to the respective resistive elements.

7. A gradation modulation apparatus according to claim 5; wherein the memory means has means for storing the weight data determined in terms of values of thermal energies generated by the respective resistive elements.

8. A gradation modulation apparatus according to claim 5; wherein the memory means has means for storing the weight data determined in terms of a dot print density corresponding to each of the respective resistive elements obtained by applying equal electric power to each of the respective resistive elements.

9. A gradation modulation apparatus according to claim 5; wherein the predetermined number of levels is 16 levels.

10. A gradation modulation apparatus according to claim 5; further comprising latching means for line-sequentially latching the modulated gradation image data and supplying the latched modulated gradation image data to the driving means.

11. A gradation modulation apparatus according to claim 5; wherein the memory means comprises a memory look-up table.

* * * * *